US 9,367,510 B2

(12) United States Patent
Dhandapani

(10) Patent No.: US 9,367,510 B2
(45) Date of Patent: Jun. 14, 2016

(54) BACKPLANE CONTROLLER FOR HANDLING TWO SES SIDEBANDS USING ONE SMBUS CONTROLLER AND HANDLER CONTROLS BLINKING OF LEDS OF DRIVES INSTALLED ON BACKPLANE

(71) Applicant: AMERICAN MEGATRENDS, INC., Norcross, GA (US)

(72) Inventor: Kayalvizhi Dhandapani, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 269 days.

(21) Appl. No.: 14/090,188

(22) Filed: Nov. 26, 2013

(65) Prior Publication Data

US 2015/0149684 A1    May 28, 2015

(51) Int. Cl.
*G06F 13/42* (2006.01)
*G06F 13/40* (2006.01)

(52) U.S. Cl.
CPC ........ *G06F 13/4282* (2013.01); *G06F 13/4072* (2013.01)

(58) Field of Classification Search
CPC   G06F 13/4284; G06F 13/4072; G06F 11/221
USPC ...................................................... 710/313
See application file for complete search history.

(56) References Cited

U.S. PATENT DOCUMENTS

| 8,099,532 B2 * | 1/2012 | Cagno ................. G06F 13/4022 340/1.1 |
| 8,149,866 B2 * | 4/2012 | Jreij .................... H04L 61/2015 370/389 |
| 9,146,823 B2 * | 9/2015 | Mondal ............... G06F 11/2236 |
| 2012/0173944 A1 * | 7/2012 | Pan ......................... H04L 43/50 714/734 |
| 2012/0239845 A1 * | 9/2012 | Dhandapani .......... G06F 3/0604 710/300 |

* cited by examiner

*Primary Examiner* — Tammara Peyton
(74) *Attorney, Agent, or Firm* — Locke Lord LLP; Tim Tingkang Xia, Esq.

(57) ABSTRACT

Present disclosure relates to a computer-implemented method for handling two SES sidebands using one SMBUS controller. The method includes one or more of following operations: (a) establishing communication between a backplane controller and a host computer through HBA, (b) receiving control commands and control data from host computer for monitoring and controlling at least one drive of first and second group of drives, (c) determining address and device number of drive to which received control commands and control data are directed, (d) forwarding control commands and control data to first or second SMBUS sideband handler based on address received, (e) controlling the blinking of the LEDs of the drive by first or second SMBUS sideband handler, (f) generating responses by the first or second SMBUS sideband handler, (g) receiving responses by the SMBUS controller, and (h) sending the responses back to the host computer within a predetermined time period.

21 Claims, 4 Drawing Sheets

| I²C ADDRESS | DEVICE NUMBER | DRIVE SLOT NUMBER |
|---|---|---|
| ADDRESS-1 = 0xC0 | 1 | 1 |
| | 2 | 2 |
| | 3 | 3 |
| | 4 | 4 |
| ADDRESS-2 = 0xC2 | 1 | 5 |
| | 2 | 6 |
| | 3 | 7 |
| | 4 | 8 |

FIG. 3

BACKPLANE CONTROLLER FOR HANDLING TWO SES SIDEBANDS USING ONE SMBUS CONTROLLER AND HANDLER CONTROLS BLINKING OF LEDS OF DRIVES INSTALLED ON BACKPLANE

FIELD

The present disclosure generally relates to a backplane with a backplane controller, and more particularly to handling two SCSI Enclosure Services (SES) sidebands using one SMBUS controller on a backplane controller.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a data center with large amount of storage space, a backplane is used to mount a number of storage drives, such as Disk Arrays, redundant array of independent disks (RAID) Subsystems, Small Computer System Interface (SCSI) and Fiber Channel (FC) Disk Array, and Switched Disk Array Servers. A host bus adapter (HBA) is used to facilitate the communication between a host computer and the backplane, and allows the host computer to monitor and manage the storage drives installed on the backplane. The HBA provides an operator with detailed information regarding the presence and status of mass storage devices, and provides facilities for generating visual indicators based upon backplane management data received from the HBA of the host computer. For instance, individual light-emitting diodes ("LEDs") may be driven by a backplane for displaying information regarding the activity, failure, rebuild status, and other information for each of the mass storage devices connected to the backplane. In order to provide these indicators and other types of functionality, a backplane typically provides connections for multiple mass storage devices, such as hard disk drives. The backplane also interfaces with an HBA and provides an interface through which the HBA may communicate with the mass storage devices. A backplane also may receive and transmit backplane management data to and from the HBA. Backplane management data is any data relating to the provision of backplane management services by a backplane.

Several different physical interfaces may be utilized to deliver backplane management data between an HBA and a backplane. For instance, some Serial Attached SCSI ("SAS")-compatible HBAs are equipped with a serial general purpose input/output interface ("SMBUS"). Some Serial Advanced Technology Attachment ("SATA")-compatible HBAs, on the other hand, utilize a control or management bus, such as the system management bus, to exchange backplane management data between the backplane and the HBA.

The particular protocol utilized to transfer backplane management data between the backplane and the HBA may also vary from vendor to vendor. However, the most popular protocols used in the backplane management are: the SCSI Enclosure Services (or SES) utilizing the system management bus (or I$^2$C bus), and the SMBUS protocol utilizing an SMBUS interface to exchange backplane management information between the HBA and the backplane. For example, when one SMBus sideband with one SMBus controller is used in a backplane controller, the backplane controller monitors and manages up to four storage drives. If eight storage drives are to be monitored and managed by that backplane controller, SMBus sideband with one SMBus controller is to be added. On the other hand, in order to reduce the hardware complexity and the cost of fabricating backplane controller chip, it is desirable to have simplified backplane controller chip with reduced hardware, such as having one SMBus controller for both SMBus sidebands, and let firmware of the backplane controller to handling two SES sidebands using one SMBUS controller on the backplane controller.

Therefore, heretofore unaddressed needs still exist in the art to address the aforementioned deficiencies and inadequacies.

SUMMARY

In one aspect, the present disclosure relates to a backplane controller for handling two SES sidebands using one SMBUS controller. In certain embodiments, the backplane controller includes a backplane controller chip installed on the backplane controller of a backplane. The backplane controller chip has: (a) an SMBUS controller, (b) a first SMBUS sideband handler, (c) a second SMBUS sideband handler, and (d) firmware of the backplane controller. The SMBUS controller is in communication with an SMBUS interface of a host bus adapter (HBA) for receiving control commands and control data from a user at a host computer. The first SMBUS sideband handler is used to control blinking of the LEDs of a first group of drives installed on the backplane. The second SMBUS sideband handler is used to control blinking of the LEDs of a second group of drives installed on the backplane. In certain embodiments, the communication between the SMBUS controller of the backplane controller chip and the SMBUS interface of the HBA is through an I$^2$C bus.

In certain embodiments, each of the first group of drives and the second group of drives has up to four storage drives. Each of the first group of drives is designated by a first address and a first device number. Each of the second group of drives is designated by a second address and a second device number. The backplane controller is in communication with the host computer through the HBA. The HBA has: (a) a PCI interface, (b) a host bus adapter controller, and (c) an SMBUS interface. The PCI interface is used for the user to receive control commands and control data to monitor and control at least one drive of the first group of drives and the second group of drives on the backplane. The host bus adapter controller includes firmware for the HBA to perform its operations. The SMBUS interface communicates with the SMBUS controller of the backplane controller.

In certain embodiments, the firmware of the backplane controller performs one or more of following operations: (a) receiving control commands and control data from the user for monitoring and controlling at least one drive of the first group of drives and the second group of drives on the backplane, (b) determining the address and the device number of the drive to which the received control commands and control data are directed, (c) forwarding the control commands and control data received to the first SMBUS sideband handler if the address is the first address; or forwarding the control commands and control data received to the second SMBUS sideband handler if the address is the second address, (d) controlling the blinking of the LEDs of the first group of drives by the first SMBUS sideband handler if the address is the first address, or controlling the blinking of the LEDs of the second group of drives by the second SMBUS sideband handler if the address is the second address, respectively, (e) generating responses by the first SMBUS sideband handler of the backplane controller if the address is the first address, or generating responses by the second SMBUS sideband handler of the backplane controller if the address is the second address, respectively, (f) receiving responses from the first SMBUS sideband handler if the address is the first address, or the second SMBUS sideband handler if the address is the second address, respectively; and (g) sending the responses back to the host computer within a predetermined time period. In certain embodiments, the predetermined time period is less than 227 mS.

In one embodiment, the control commands and the control data are transmitted in accordance with the SES specification to instruct the backplane controller to monitor the drive and LEDs associated with the drive, and control the functions of the drive, and the LEDs associated with the drive. In another embodiment, the control commands and the control data are transmitted in accordance with the IPMI specification to instruct the backplane controller to monitor the drive and LEDs associated with the drive, and control the functions of the drive, and the LEDs associated with the drive. The IPMI control commands may include extended OEM IPMI commands. In yet another embodiment, the control commands and the control data are transmitted in accordance with the SMBUS specification to instruct the backplane controller to monitor the drive and LEDs associated with the drive, and control the functions of the drive, and the LEDs associated with the drive.

In another aspect, the present disclosure relates to a computer-implemented method for handling two SES sidebands using one SMBUS controller. In certain embodiments, the computer-implemented method includes one or more of following operations: (a) establishing communication between a backplane controller on a backplane and a host computer through a host bus adapter (HBA) over an SMBUS communication link, (b) receiving control commands and control data from a user at the host computer for monitoring and controlling at least one drive of a first group of drives and a second group of drives on the backplane, the drive has an address and a device number, (c) determining the address and the device number of the drive to which the received control commands and control data are directed, (d) forwarding the control commands and control data received to a first SMBUS sideband handler of the backplane controller if the address is a first address, or forwarding the control commands and control data received to a second SMBUS sideband handler of the backplane controller if the address is a second address, (e) controlling the blinking of the LEDs of the first group of drives by the first SMBUS sideband handler if the address is the first address, or controlling the blinking of the LEDs of the second group of drives by the second SMBUS sideband handler if the address is the second address, respectively, (f) generating responses by the first SMBUS sideband handler of the backplane controller if the address is the first address, or generating responses by the second SMBUS sideband handler of the backplane controller if the address is the second address, respectively, (g) receiving responses from the first SMBUS sideband handler if the address is the first address, or the second SMBUS sideband handler if the address is the second address, respectively; and (h) sending the responses back to the host computer within a predetermined time period.

In certain embodiments, the backplane controller has: (a) an SMBUS controller, (b) the first SMBUS sideband handler, (c) the second SMBUS sideband handler, and (d) firmware of the backplane controller. The SMBUS controller is in communication with an SMBUS interface of the host bus adapter (HBA) for receiving control commands and control data. The first SMBUS sideband handler is used to control blinking of the LEDs of the first group of drives installed on the backplane, and the second SMBUS sideband handler is used to control blinking of the LEDs of the second group of drives installed on the backplane, respectively. The communication between the SMBUS controller of the backplane controller chip and the SMBUS interface of the HBA is through an $I^2C$ bus.

In certain embodiments, each of the first group of drives and the second group of drives has up to four storage drives. Each of the first group of drives is designated by the first address and the first device number. Each of the second group of drives is designated by the second address and the second device number. The backplane controller is in communication with the host computer through the HBA. The HBA has: (a) a PCI interface, (b) a host bus adapter controller, and (c) an SMBUS interface. The PCI interface is used for the user to receive control commands and control data to monitor and control at least one drive of the first group of drives and the second group of drives on the backplane. The host bus adapter controller includes firmware for the HBA to perform its operations. The SMBUS interface communicates with the SMBUS controller of the backplane controller.

In certain embodiments, the firmware of the backplane controller performs one or more of following operations: (a) receiving control commands and control data from the user for monitoring and controlling at least one drive of the first group of drives and the second group of drives on the backplane, (b) determining the address and the device number of the drive to which the received control commands and control data are directed, (c) forwarding the control commands and control data received to the first SMBUS sideband handler if the address is the first address, or forwarding the control commands and control data received to the second SMBUS sideband handler if the address is the second address, (d) receiving response from the drive to which the control commands and control data are directed, and (e) sending the received response to the host computer within a predetermined time period. In certain embodiments, the predetermined time period is less than 227 mS.

In yet another aspect, the present disclosure relates to a non-transitory computer storage medium. In certain embodiments, the non-transitory computer storage medium stores certain computer-executable instructions. When some or all of the computer-executable instructions are executed by a processor of a backplane controller, cause the processor to perform one or more of following operations to handle two SES sidebands using one SMBUS controller: (a) establishing communication between a backplane controller on a backplane and a host computer through a host bus adapter (HBA) over an SMBUS communication link, (b) receiving control commands and control data from a user at the host computer for monitoring and controlling at least one drive of a first group of drives and a second group of drives on the backplane, the drive has an address and a device number, (c) determining the address and the device number of the drive to which the received control commands and control data are directed, (d) forwarding the control commands and control data received to a first SMBUS sideband handler of the backplane controller if the address is a first address, or forwarding the control commands and control data received to a second SMBUS sideband handler of the backplane controller if the address is a second address, (e) controlling the blinking of the LEDs of the first group of drives by the first SMBUS sideband handler if the address is the first address, or controlling the blinking of the LEDs of the second group of drives by the second SMBUS sideband handler if the address is the second address, respectively, (f) generating responses by the first SMBUS sideband handler of the backplane controller if the address is the first address, or generating responses by the second SMBUS sideband handler of the backplane controller if the address is the second address, respectively, (g) receiving responses from the first SMBUS sideband handler if the address is the first address, or the second SMBUS sideband handler if the address is the second address, respectively; and (h) sending the responses back to the host computer within a predetermined time period.

In certain embodiments, the backplane controller has: (a) an SMBUS controller, (b) the first SMBUS sideband handler, (c) the second SMBUS sideband handler, and (d) firmware of the backplane controller. The SMBUS controller is in communication with an SMBUS interface of the host bus adapter (HBA) for receiving control commands and control data. The first SMBUS sideband handler is used to control blinking of the LEDs of the first group of drives installed on the backplane, and the second SMBUS sideband handler is used to control blinking of the LEDs of the second group of drives installed on the backplane, respectively. The communication between the SMBUS controller of the backplane controller chip and the SMBUS interface of the HBA is through an I²C bus.

BRIEF DESCRIPTION OF THE DRAWINGS

The accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein:

FIG. 3 shows a device number, I²C address and drive slot number table according certain embodiments of the present disclosure.

DETAILED DESCRIPTION

Figure 1:
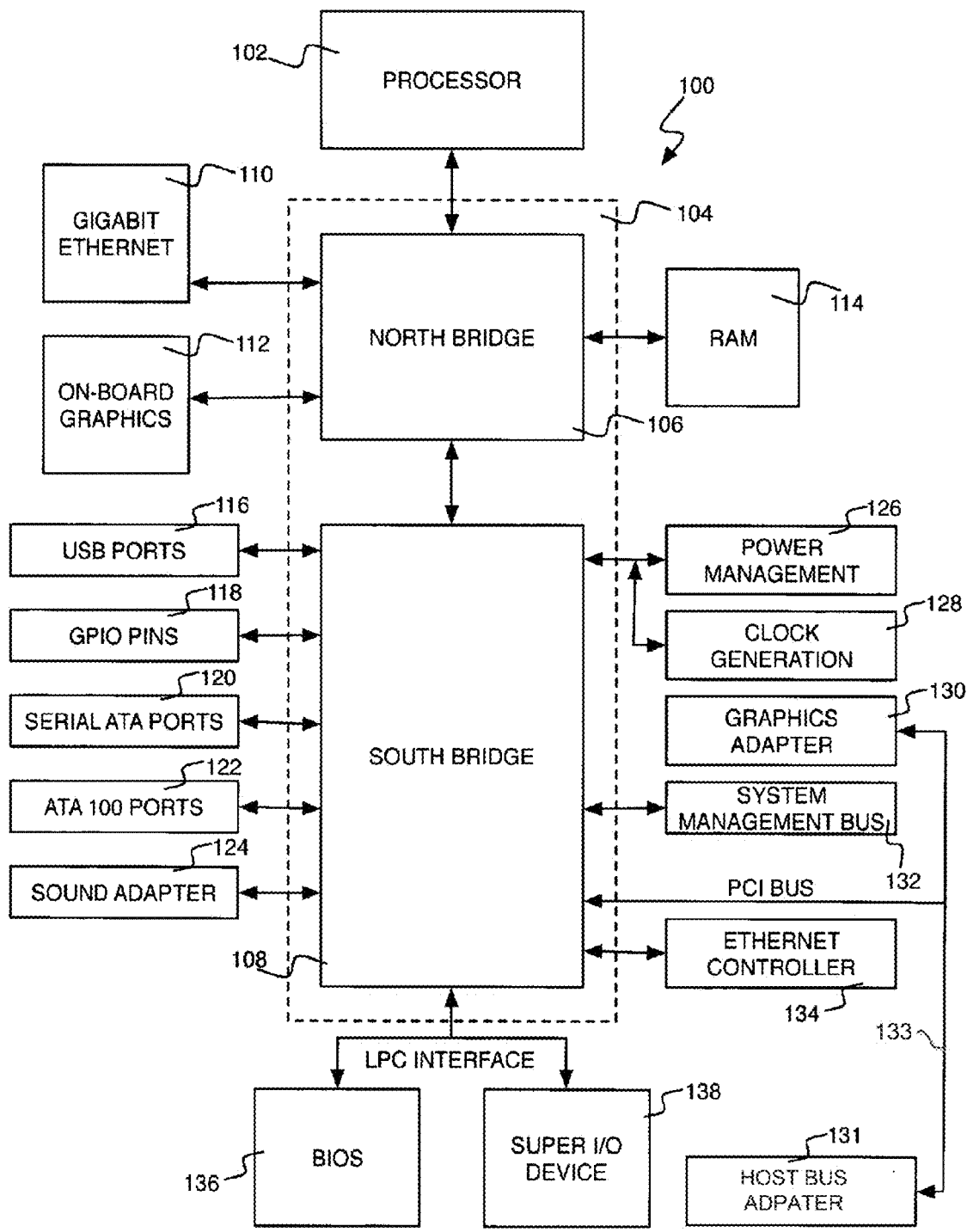
FIG. 1 schematically shows a computer architecture diagram showing aspects of a computer utilized as an illustrative operating environment for the various embodiments of the present disclosure.

The present disclosure is more particularly described in the following examples that are intended as illustrative only since numerous modifications and variations therein will be apparent to those skilled in the art. Various embodiments of the present disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the present disclosure, and in the specific context where each term is used. Certain terms that are used to describe the present disclosure are discussed below, or elsewhere in the specification, to provide additional guidance to the practitioner regarding the description of the present disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the present disclosure or of any exemplified term. Likewise, the present disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximates, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, FIGS. 1-4, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art. Like numbers refer to like elements throughout.

FIG. 1 and the following discussion are intended to provide a brief, general description of a suitable computing environment in which the present disclosure may be implemented. Generally, program modules include routines, programs, components, data structures, and other types of structures that perform particular tasks or implement particular abstract data types. Moreover, those skilled in the art will appreciate that the present disclosure may be practiced with other computer system configurations, including hand-held devices, multiprocessor systems, microprocessor-based or programmable consumer electronics, minicomputers, mainframe computers, and the like. The present disclosure may also be practiced in distributed computing environments where tasks are performed by remote processing devices that are linked through a communications network. In a distributed computing environment, program modules may be located in both local and remote memory storage devices.

Referring now to FIG. 1, details regarding an illustrative operating environment for embodiments of the present disclosure will be provided. In particular, FIG. 1 illustrates a computer configuration for practicing the embodiments of the present disclosure. It should be appreciated, however, that although the embodiments of the present disclosure described herein are discussed in the context of a conventional desktop or server computer, the embodiments of the present disclosure may be utilized with virtually any type of computing device.

As described briefly above, the embodiments of the present disclosure provide a method and integrated circuit for enabling the use of multiple backplane management interfaces and multiple backplane management protocols. FIG. 1 illustrates a host computer that, as will be described in greater detail below, may utilize one or more backplanes to interface with one or more mass storage devices. The backplanes described herein are equipped with an integrated circuit capable of utilizing multiple interfaces and protocols for exchanging backplane management information with the host computer 100 or with another computer equipped with a host bus adapter (HBA) utilizing a different backplane management interface and protocol. It should be appreciated that the architecture of the host computer 100 is merely illustrative and that any type of computer capable of hosting an HBA with backplane management functionality may be utilized. The host computer 100 of the present disclosure may be implemented utilizing a general purpose computer, a custom application specific integrated circuit, a field-programmable gate array (FPGA) device, or any other type of IC or computing known to those skilled in the art.

An illustrative computer architecture for practicing the various embodiments of the present disclosure will now be described. In particular, a host computer 100 is utilized that is equipped with an HBA. In order to provide this functionality, the host computer 100 includes a baseboard, or "motherboard", which is a printed circuit board to which a multitude of components or devices may be connected by way of a system bus or other electrical communication path. In one illustrative embodiment, a processor ("processor" or "CPU") 102 operates in conjunction with a chipset 104. The CPU 102 is a standard central processor that performs arithmetic and logical operations necessary for the operation of the host computer 100.

The chipset 104 includes a north bridge 106 and a south bridge 108. The north bridge 106 provides an interface between the CPU 102 and the remainder of the host computer 100. The north bridge 106 also provides an interface to the random access memory ("RAM") 114 and, possibly, an on-board graphics adapter 112. The north bridge 106 may also include functionality for providing networking functionality through a gigabit Ethernet adapter 110. The gigabit Ethernet adapter 110 is capable of connecting the host computer 100 to another computer via a network. Connections which may be made by the network adapter 110 may include local area network ("LAN"), wide area network ("WAN") or Wi-Fi connections. LAN, WAN and Wi-Fi networking environments are commonplace in offices, enterprise-wide computer networks, intranets, and the Internet. The north bridge 106 is connected to the south bridge 108.

The south bridge 108 is responsible for controlling many of the input/output functions of the host computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a system management bus 132 for use in managing the various components of the host computer 100. Power management circuitry 126 and clock generation circuitry 128 may also be utilized during the operation of the south bridge 108. The south bridge 108 may also provide a bus for interfacing peripheral card devices such as a graphics adapter 130. In one embodiment, the bus comprises a peripheral component interconnect ("PCI") bus 133. The PCI bus 133 may also be utilized to interface with one or more host bus adapters (HBAs), such as the SATA or SAS HBA 131. As described in greater detail below, the HBA 131 may be connected to a backplane for providing backplane management functionality.

According to embodiments, the south bridge 108 can be an enhanced south bridge operative to provide an HBA for connecting mass storage devices to the host computer 100 without the use of an add-in card such as the PCI HBA 131. For instance, according to an embodiment, the south bridge 108 includes a serial advanced technology attachment ("ATA") adapter for providing one or more serial ATA ports 120 and an ATA 100 adapter for providing one or more ATA 100 ports 122. The serial ATA ports 120 and the ATA 100 ports 122 may be, in turn, connected directly to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user. Alternatively, the serial ATA ports 120 may be connected to a backplane for providing backplane management functionality.

The mass storage devices connected to the south bridge 108, and its associated computer-readable media provide non-volatile storage for the host computer 100. Although the description of computer-readable media contained herein refers to a mass storage device, such as a hard disk or CD-ROM drive, it should be appreciated by those skilled in the art that computer-readable media can be any available media that can be accessed by the host computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a read-only memory ("ROM") device for storing a basic input/output system ("BIOS") 136 of an extensible firmware interface ("EFI") compatible firmware that includes program code containing the basic routines that help to start up the host computer 100 and to transfer information between elements within the host computer 100. It should be appreciated that the host computer 100 may comprise other types of computing devices, including hand-held computers, embedded computer systems, personal digital assistants, and other types of computing devices known to those skilled in the art. It is also contemplated that the host computer 100 may not include all of the components shown in FIG. 1, may include other components that are not explicitly shown in FIG. 1, or may utilize an architecture completely different than that shown in FIG. 1.

Figure 2:
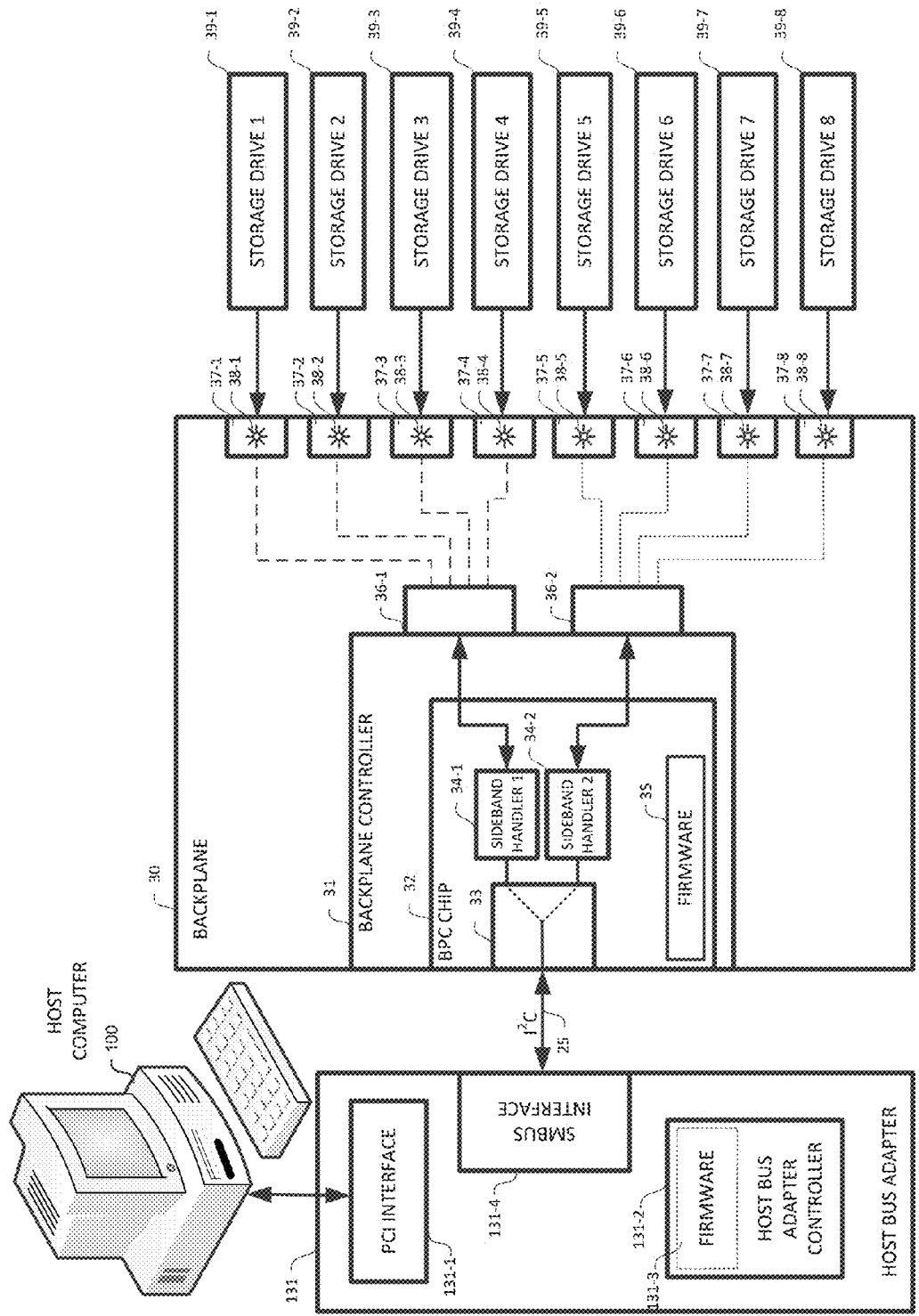
FIG. 2 schematically shows a block diagram of a backplane controller capable of handling two SES sidebands using one SMBUS controller according to certain embodiments of the present disclosure.

Turning now to FIG. 2, where a block diagram of an enclosure management controller (EMC) environment is schematically shown according to one embodiment of the present disclosure. This EMC environment includes: (a) a host computer 100 having a peripheral component interconnect (PCI) bus interface and an EMC management software installed, (b) a host bus adapter (HBA) 131, (c) a backplane 30 having a backplane controller 31 with a backplane controller chip 32 installed.

Generally, one backplane controller chip can monitor and manage up to 8 storage drives. In this embodiment, eight storage drives are divided into two groups: a first group of drives, and a second group of drives. The first group of drives includes: storage drive 1, 39-1, storage drive 2, 39-2, storage drive 3, 39-3, and storage drive 4, 39-4. The second group of drives includes: storage drive 1, 39-5, storage drive 2, 39-6, storage drive 3, 39-7, and storage drive 4, 39-8.

The first group of drives is connected to the backplane 30 through four separate storage drive connectors 37-1, 37-2, 37-3, and 37-4, and the second group of drives is connected to the backplane 30 through another four separate storage drive connectors 37-5, 37-6, 37-7, and 37-8. On each of the storage drive connectors, there are one or more LEDs indicating the status and working conditions of the storage drives. These LEDs are shown as 38-1, 38-2, 38-3, 38-4, 38-5, 38-6, 38-7, and 38-8, respectively.

In certain embodiments, these LEDs 38-1 through 38-8 typically include 2 or 3 LEDs per storage drive. For backplanes with 2 LEDs per storage drive, they include a first green LED indicating presence and/or activity, and a second LED indicating Status. For backplanes with 3 LEDs per storage drive, they include a first green LED indicating presence and/or activity, a second LED indicating Locate, and a third LED indicating Fail.

Although many hardware vendors define their own proprietary LED blinking pattern, the common standard for SCSI Enclosure Services (SES) interpretation and LED blinking pattern can be found in an internal computer hardware standard—International Blinking Pattern Interpretation (IBPI). IBPI was defined by the SFF-8489 specification of the Small Form Factor Special Interest Group in 2011, and its specification is incorporated herein by reference in its entirety.

In one embodiment, as shown in FIG. 2, the HBA 131 has: (a) a PCI interface 131-1, (b) a host bus adaptor controller 131-2 having firmware 131-3 for the host bus adaptor controller 131-2, (c) an SMBUS interface 131-4. The PCI interface 131-1 is used to communicate with the host computer 100. When a user uses the host computer to monitor and manage the storage drives 39-1 through 39-8 on the backplane 30, the user uses the EMC management software to send control commands and control data to these storage drives and to receive responses from these storage drives. The firmware 131-3 on the HBA controller 131-2 is used to control the operation of the HBA 131, and to assist the communication between the host computer and the storage drives on the backplane 30. The SMBUS interface 131-4 is connected to the backplane through an $I^2C$ bus 25.

In one embodiment, as shown in FIG. 2, the HBA 20 has: (a) a PCI interface 21, (b) a host bus adaptor controller 22 having firmware 23 for the host bus adaptor controller 22, (c) an SMBUS interface 24. The PCI interface 21 is used to communicate with the host computer 100. When a user uses the host computer to monitor and manage the storage drives 39-1 through 39-8 on the backplane 30, the user uses the EMC management software to send control commands and control data to these storage drives and to receive responses from these storage drives. The firmware 23 on the HBA controller 22 is used to control the operation of the HBA 20, and to assist the communication between the host computer and the storage drives on the backplane 30. The SMBUS interface 24 includes a first SMBUS channel 24-1 for monitoring and managing the first group of drives 39-1 through 39-4, and a second SMBUS channel 24-2 for monitoring and managing the second group of drives 39-5 through 39-8, respectively.

In certain embodiments, the backplane 30 includes a backplane controller 31, and eight storage connectors 37-1 through 37-8 for connecting the eight storage drives 39-1 through 39-8. The backplane controller 31 has a backplane controller chip 32, a first SMBUS output connector 36-1, and a second SMBUS output connector 36-2. The first SMBUS output connector 36-1 of the backplane controller 31 is used for connecting to the first group of drives 39-1 through 39-4. The second SMBUS output connector 36-2 of the backplane controller 31 is used for connecting to the second group of drives 39-5 through 39-8.

According to embodiments, the backplane controller chip 32 shown in FIG. 2 is equipped with multiple physical interfaces commonly used by various vendors for communicating backplane management data with an HBA or, in this example, the HBA 131. For instance, the backplane controller chip 32 may include an SMBUS interface 33 for communicating backplane management data with an SAS-equipped HBA.

In certain embodiments, the backplane controller chip 32 has a first SMBUS sideband handler 34-1, a second SMBUS sideband handler 34-2, an SMBUS controller 33, and firmware 35 to manage the operation of the backplane controller chip 32. The first SMBUS sideband handler 34-1 is used to receive the control commands and control data for monitoring and managing the first group of drives, and the second SMBUS sideband handler 34-2 is used to receive the control commands and control data for monitoring and managing the second group of drives.

Conventionally, backplane controller chip has two SMBUS controllers, one for first SMBUS sideband handler 34-1 for the first group of drives 39-1 through 39-4, and the other for second SMBUS sideband handler 34-2 for the second group of drives 39-5 through 39-8. However, the number of SMBUS controller 33 can be reduced to one if the SMBUS controller 33 can distinguish the control commands and control data are from the first group of drives or the second group of drives. The control data may include an address to differentiate the source of the control commands and control data. In one embodiment, control data includes a first address (0xC0) and a second address (0xC2). Therefore, if the control commands and control data are intended to deliver to one storage drive with device number DN of the first group of drives, the control data includes the first address (0xC0). If the control commands and control data are intended to deliver to one storage drive with device number DN of the second group of drives, the control data includes the second address (0xC2). Removing one SMBUS controller means significant savings of production cost, and the space of backplane controller chip.

In certain embodiments, the control commands and control data for the first group of drives and for the second group of drives from the host computer 100 are received at the SMBUS controller 33. The SMBUS controller 33 checks the address in the control data. If the address in the control data is the first address, the control commands and control data received are forwarded to the first SMBUS sideband handler 34-1 for processing. The processed control commands and control data are forwarded to the first SMBUS output connector 36-1 for the first group of drives 39-1 through 39-4, respectively. If the address in the control data is the second address, the control commands and control data received are forwarded to the second SMBUS sideband handler 34-2 for processing. The processed control commands and control data are forwarded to the second SMBUS output connector 36-2 for the second group of drives 39-5 through 39-8, respectively.

In certain embodiment, the host computer 100 transmits control commands and control to the backplane controller 31 to monitor and manage one or more of the storage drives 39-1 through 39-8 installed on the backplane 30. For example, the control commands can be those that are typically issued through the host bus adapter for use with SATA mass storage devices or compatible with SAS mass storage devices. It should be appreciated that the control commands issued by the HBA 131 can be those typically issued by other types of HBAs compatible with other types of mass storage devices.

According to embodiments of the present disclosure, different physical interfaces may be utilized by the HBA 131 to exchange backplane management data between the HBA 131 and the backplane 30. For instance, some SAS-compatible HBAs are equipped with an SGPIO interface (not shown in FIG. 2), while some SATA-compatible HBAs, on the other hand, utilize a control or management bus, such as the system management bus through the system management bus (SMBus), to exchange backplane management data between the backplane 30 and the HBA 131. System Management Bus (SMBus) Specification version 2.0, published on Aug. 3, 2000, is incorporated herein by reference in its entirety.

It should be appreciated that the particular physical interfaces described herein for exchanging backplane management information with the backplane are merely illustrative and that any physical communications link suitable for transmitting backplane management data may be utilized with the various aspects of the present disclosure. In this embodiment, the HBA 131 supports multiple backplane management interfaces and protocols, such as system management bus, SGPIO, or some custom backplane management bus. The backplane controller 31 used in this embodiment has the first SMBUS output connector 36-1 and the second SMBUS output connector 36-2, and can support backplanes 30 utilizing the $I^2C$ buses, and all standard SMBUS bus management commands. In many circumstances, SGPIO buses, connectors, and control firmware can be used in place of system management buses, connectors, and control firmware.

It is also possible that an HBA can be configured to support a particular backplane management protocol by upgrading the backplane controller firmware 35, or by using host-side applications, command line utilities, or configuration monitors i.e. over a direct serial port to the HBA 131. This same access and configuration method could be used to change or otherwise configure specific instructions and commands that are sent to the backplane.

As discussed briefly above, the backplane 30 provides a number of backplane management functions. To enable this functionality, the backplane 30 is equipped with a backplane controller chip 32. The backplane controller chip 32 is operative to receive backplane management control commands and control data from the HBA 131 on one of any number of physical interfaces, such as system management bus and/or SGPIO bus, and to perform various management functions in response to the management data received. For instance, the backplane controller chip 32 may receive data from the HBA 131 instructing it to illuminate one of LEDs 38-1 through 38-8 for locating a particular one of the storage drives 39-1 through 39-8, respectively. The backplane controller chip 32 may also illuminate the LEDs 38-1 through 38-8 to indicate activity on the storage drives 39-1 through 39-8, respectively. The LEDs 38-1 through 38-8 may also be illuminated by the backplane controller chip 32 to indicate that one of the storage drives 39-1 through 39-8 has failed. LEDs 38-1 through 38-8 may also be illuminated to provide a global indication that one of the storage drives 39-1 through 39-8, or a storage drive connected to another connected backplane, is active or has failed. The backplane controller chip 32 may also provide information to the HBA 131. For instance, data indicating whether a particular storage drive is mated to the backplane 30 may be provided by the backplane controller chip 32 to the HBA 131.

Referring now to FIG. 3, a device number, $I^2C$ address and drive slot number table is shown according certain embodiments of the present disclosure. In certain embodiments, each of the first group of drives and the second group of drives includes up to four storage drives. Each of the four storage drives of the first group of drives is represented by a first device number 1 through 4 and the first device number is also a part of the control data transmitted from the host computer 100 to the backplane controller 31. Each of the four storage drives of the second group of drives is represented by a second device number also 1 through 4 and the second device number is also a part of the control data transmitted from the host computer 100 to the backplane controller 31. For example, the first group of drives includes the first storage drive (first device number 1), the second storage drive (first device number 2), the third storage drive (first device number 3), and the fourth storage drive (first device number 4). The second group of drives includes the fifth storage drive (second device number 1), the sixth storage drive (second device number 2), the seventh storage drive (second device number 3), and the eighth storage drive (second device number 4). Therefore, at any time, the first device number and the second device number 1 through 4 are transmitted to the backplane controller 32 as a part of control data from the first SMBUS sideband handler 34-1 and the second SMBUS sideband handler 34-2. However, they represent the first group of drives 39-1 through 39-4, and the second group of drives 39-5 through 39-8, respectively. Although the first device number and the second device number are both 1 through 4, if the address of the control data is the first address (0xC0), the decoded SMBUS control commands and control data at the output of the first SMBUS sideband handler 34-1 are directed to the first group of drives 39-1 through 39-4, and if the address of the control data is the second address (0xC2), the decoded SMBUS control commands and control data at the output of the second SMBUS sideband handler 34-2 are directed to the second group of drives 39-5 through 39-8, respectively. Therefore, the address decides which group of drives to which the control commands and control data are directed, and the device number decides a specific drive to which the control commands and control data are directed in the group. For example, if the address is the first address (0xC0), and the device number DN is 3, then the control commands and control data received are directed to the storage drive 3 of the first group of drives. On the other hand, if the address is the first address (0xC2), and the device number DN is 2, then the control commands and control data received are directed to the storage drive 6 of the second group of drives.

Additionally, HBA manufacturers may define their own proprietary protocols. In many cases, an HBA manufacturer will utilize a standard protocol, such as IBPI or SES, as the foundation for its protocol but will modify the standard protocol to define its own proprietary protocol. For instance, an HBA manufacturer may change the order that data is presented or add particular proprietary data to the protocol. In certain embodiments, the HBA 131 can be configured to transmit control commands and control data in accordance with various proprietary protocols.

Figure 4:
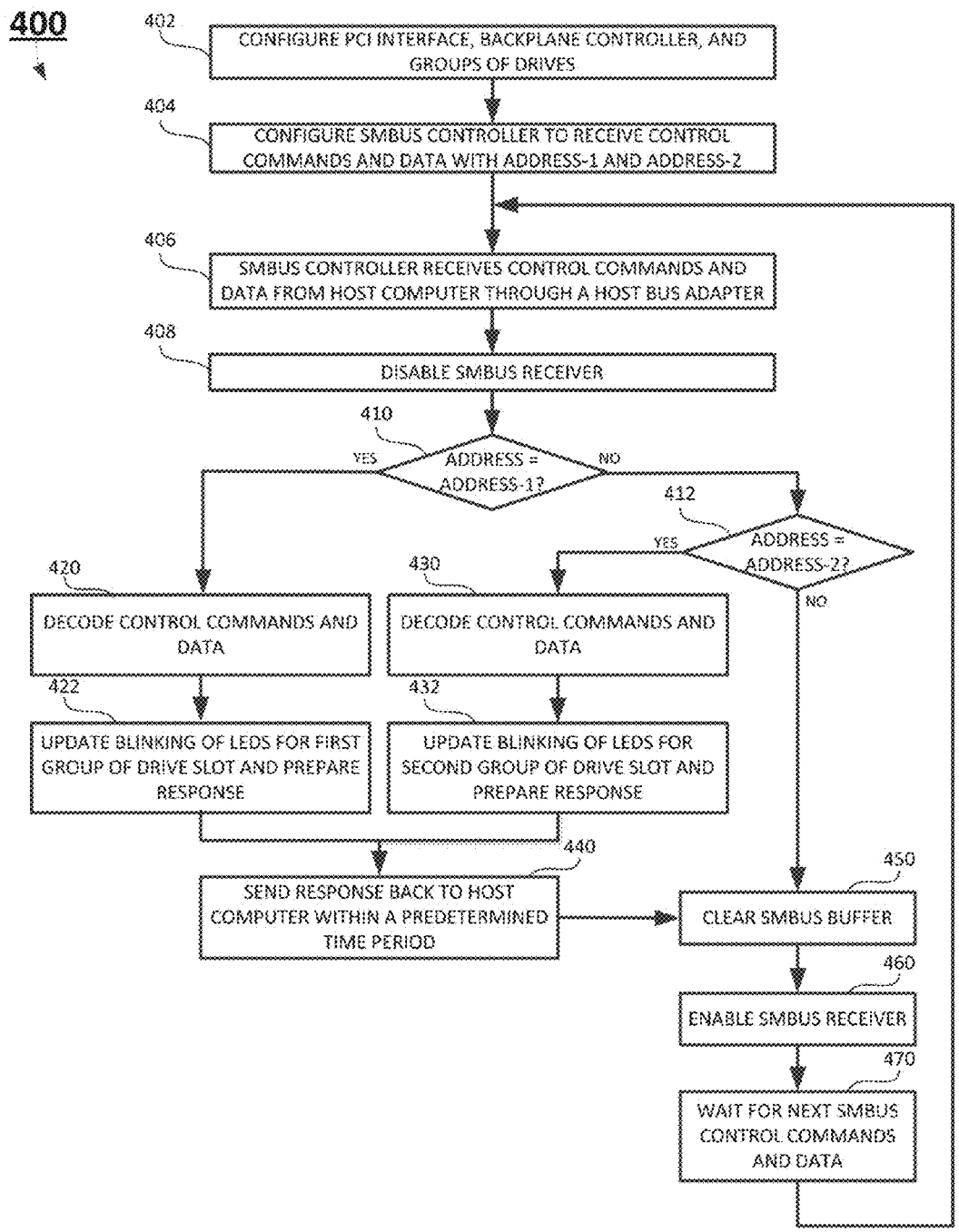
FIG. 4 shows a block diagram of the operation of the backplane controller capable of handling two SES sidebands using one SMBUS controller according certain embodiments of the present disclosure.

Referring now to FIG. 4, a block diagram of the operation of the backplane controller capable of handling two SMBUS sidebands using one SMBUS controller is shown according certain embodiments of the present disclosure.

At operation 402, a user uses the EMC management software on the host computer 100 to configure the PCI interface of the host computer 100, the PCI interface 131-1 of the host bus adapter (HBA) 131, the backplane controller, and the first group of drives 39-1 through 39-4, the second group of drives 39-5 through 39-8. The configuration includes the selection of storage drive management protocol such as SCSI Enclosure Services (SES) and intelligent platform management interface (IPMI), the number of storage drives installed on the first group of drives, and the second group of drives, the clock rate, and many other parameters necessary for the EMC management software on the host computer 100 to monitor and manage the first group of drives 39-1 through 39-4 and the second group of drives 39-5 through 39-8.

At operation 404, the EMC management software on the host computer 100 is used to configure the SMBUS controller 33 to receive control commands and control data with two unique addresses: a first address and a second address. In one embodiment, the first address is oxC0, and the second address is 0xC2.

At operation 404, the host computer 100 monitors and manages the first group of drives 39-1 through 39-4 and the second group of drives 39-5 through 39-8, over the PCI interface 131-1 of the HBA 131, the HBA 131, the I²C bus 25, and SMBUS controller 33, the first SMBUS sideband handler 34-1 and the second SMBUS sideband handler 34-2, the first SMBUS output connector 36-1 and the second SMBUS output connector 36-2, the first group of drives 39-1 through 39-4, and the second group of drives 39-5 through 39-8.

At operation 408, SMBUS receiver of the SMBUS controller is disabled.

At inquiry operation 410, the SMBUS controller 33 receives control commands and control data from the EMC management software of the host computer 100 for monitoring and manage a drive of the first group of drives 39-1 through 39-4, with control commands and control data containing the first address, and a drive of the second group of drives 39-5 through 39-8, with control commands and control data containing the second address. As discussed earlier, the control data includes a device number to which the control commands and control data are directed. The first device number 1 through 4 of the first group of drives represent the first storage drive 39-1, the second storage drive 39-2, the third storage drive 39-3, and the fourth storage drive 39-4, respectively. The second device number 1 through 4 of the second group of drives represent the fifth storage drive 39-5, the sixth storage drive 39-6, the seventh storage drive 39-7, and the eighth storage drive 39-8. During the inquiry operation 408, the SMBUS controller 33 extracts the address of the control commands and control data from the control data, and determines the destination of the control commands and control data received. If the address extracted is the first address, the monitoring and managing process continue to operation 420 for the first group of drives 39-1 through 39-4.

At the operation 412, if the address extracted is not the first address, the monitoring and managing process continue to operation 412 to check if the address extracted is the second address. If the address extracted is the second address, the monitoring and managing process continue to operation 430 for the second group of drives 39-5 through 39-8. If the address extracted is not the second address, the monitoring and managing process continue to operation 450.

When the address is the first address, at operation 420, the control commands and control data received from the I²C bus 25 are directed to the first SMBUS sideband handler 34-1 for processing. The processing includes decoding the control commands and control data.

At operation 422, in one embodiment, the SMBUS controller 33 updates the blinking of LEDs for the first group of drive slots and prepares responses to the SMBUS interface 131-4 of the host bus adapter 131. The monitoring and managing process continue to operation 440.

On the other hand, when the address is the second address, at operation 430, the control commands and control data received from the I²C bus 25 are directed to the second SMBUS sideband handler 34-2 for processing. The processing includes decoding the control commands and control data.

At operation 432, in one embodiment, the SMBUS controller 33 updates the blinking of LEDs for the second group of drive slots and prepares responses to the SMBUS interface 131-4 of the host bus adapter 131. The monitoring and managing process continue to operation 440.

At operation 440, if the SMBUS controller 33 encodes the responses generated from operation 420 and 430 and send the encoded responses back to the host computer 100 through the I²C bus 25, the SMBUS interface 131-4 of the HBA 131, the PCI interface 131-1 of the HBA 131. Then the monitoring and managing process continue to operation 450.

At operation 450, an SMBUS buffer is cleared.

At operation 460, the SMBUS receiver of the SMBUS controller is enabled.

At operation 470, the SMBUS controller 33 waits for next SMBUS control commands and control data from the host computer, and the monitoring and managing process continue to operation 406 to repeat the process described above.

The foregoing description of the exemplary embodiments of the present disclosure has been presented only for the purposes of illustration and description and is not intended to be exhaustive or to limit the present disclosure to the precise forms disclosed. Many modifications and variations are possible in light of the above teaching.

The embodiments were chosen and described in order to explain the principles of the present disclosure and their practical application so as to enable others skilled in the art to utilize the present disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A backplane controller for handling two SCSI Enclosure Services (SES) sidebands using one system management bus (SMBUS) controller, comprising a backplane controller chip installed on a backplane controller of a backplane, having
   an SMBUS controller in communication with an SMBUS interface of a host bus adapter (HBA) for receiving control commands and control data from a user at a host computer;
   a first SMBUS sideband handler configured to control blinking of LEDs of a first group of drives installed on the backplane;
   a second SMBUS sideband handler configured to control blinking of LEDs of a second group of drives installed on the backplane; and
   firmware of the backplane controller.

2. The backplane controller of claim 1, wherein the communication between the SMBUS controller of the backplane controller chip and the SMBUS interface of the HBA is through an I²C bus.

3. The backplane controller of claim 1, wherein each of the first group of drives and the second group of drives comprises a plurality of drives, and each of the first group of drives is designated by a first address and a first device number, and each of the second group of drives is designated by a second address and a second device number.

4. The backplane controller of claim 3, wherein the backplane controller is in communication with the host computer through the HBA having
   a PCI interface configured for the user to receive the control commands and the control data for monitoring and controlling at least one drive of the first group of drives and the second group of drives on the backplane;
   a host bus adapter controller having firmware configured to perform HBA operations; and
   an SMBUS interface configured to communicate with the SMBUS controller of the backplane controller.

5. The backplane controller of claim 4, wherein the firmware of the backplane controller is configured to perform one or more of following operations:
   receiving the control commands and the control data from the user for monitoring and controlling at least one drive of the first group of drives and the second group of drives on the backplane, wherein each of the at least one drive has an address and a device number;
   determining the address and the device number of the drive to which the received control commands and the control data are directed;
   forwarding the control commands and the control data received to the first sideband handler if the address is the first address; or forwarding the control commands and the control data received to the second sideband handler if the address is the second address;
   controlling the blinking of the LEDs of the first group of drives by the first SMBUS sideband handler if the address is the first address, or controlling the blinking of the LEDs of the second group of drives by the second SMBUS sideband handler if the address is the second address, respectively;
   generating responses by the first SMBUS sideband handler of the backplane controller if the address is the first address, or generating responses by the second SMBUS sideband handler of the backplane controller if the address is the second address, respectively;
   receiving responses from the first SMBUS sideband handler if the address is the first address, or the second SMBUS sideband handler if the address is the second address, respectively; and
   sending the responses back to the host computer within a predetermined time period.

6. The backplane controller of claim 5, wherein the predetermined time period is less than 227 mS.

7. The backplane controller of claim 5, wherein the control commands and the control data are configured in accordance with the SES specification to instruct the backplane controller to monitor the drive and the LEDs associated with the drive, and control the functions of the drive, and the LEDs associated with the drive.

8. The backplane controller of claim 5, wherein the control commands and the control data are configured in accordance with intelligent platform management interface (IPMI) specification to instruct the backplane controller to monitor the drive and the LEDs associated with the drive, and control the functions of the drive, and the LEDs associated with the drive.

9. The backplane controller of claim 8, wherein the IPMI control commands comprises a plurality of extended OEM IPMI commands.

10. The backplane controller of claim 5, wherein the control commands and the control data are configured in accordance with the SGPIO specification to instruct the backplane controller to monitor the drive and the LEDs associated with the drive, and control the functions of the drive, and the LEDs associated with the drive.

11. A computer-implemented method for emulating two sets of SCSI Enclosure Services (SES) targets using one system management bus (SMBUS) controller, comprising:
   establishing communication between a backplane controller on a backplane and a host computer through a host bus adapter (HBA) over an SMBUS communication link,
   receiving control commands and control data from a user at the host computer for monitoring and controlling at least one drive of a first group of drives and a second group of drives on the backplane, wherein each of the at least one drive has an address and a device number;

determining the address and the device number of the drive to which the control commands and the control data received are directed;

forwarding the control commands and the control data received to a first SMBUS sideband handler of the backplane controller if the address is a first address; or forwarding the control commands and the control data received to a second SMBUS sideband handler of the backplane controller if the address is a second address;

controlling blinking of LEDs of the first group of drives by the first SMBUS sideband handler if the address is the first address, or controlling blinking of LEDs of the second group of drives by the second SMBUS sideband handler if the address is the second address, respectively;

generating responses by the first SMBUS sideband handler of the backplane controller if the address is the first address, or generating responses by the second SMBUS sideband handler of the backplane controller if the address is the second address, respectively;

receiving the responses from the first SMBUS sideband handler if the address is the first address, or the second SMBUS sideband handler if the address is the second address, respectively; and sending the responses back to the host computer within a predetermined time period.

12. The computer-implemented method of claim 11, wherein the backplane controller comprises
   an SMBUS controller in communication with an SMBUS interface of the HBA for receiving the control commands and the control data;
   the first SMBUS sideband handler configured to communicate with the first group of drives installed on the backplane;
   the second SMBUS sideband handler configured to communicate with the second group of drives installed on the backplane; and
   firmware of the backplane controller.

13. The computer-implemented method of claim 12, wherein the communication between the SMBUS controller of the backplane controller chip and the SMBUS interface of the HBA is through an I²C bus.

14. The computer-implemented method of claim 11, wherein each of the first group of drives and the second group of drives comprises a plurality of drives, and each of the first group of drives is designated by the first address and a first device number, and each of the second group of drives is designated by the second address and a second device number.

15. The computer-implemented method of claim 11, wherein the backplane controller is in communication with the host computer through the HBA having
   a PCI interface configured for the user to receive the control commands and the control data for monitoring and controlling at least one drive of the first group of drives and the second group of drives on the backplane;
   a host bus adapter controller having firmware configured to perform HBA operations; and
   an SMBUS interface configured to communicate with the SMBUS controller of the backplane controller.

16. The computer-implemented method of claim 12, wherein the firmware of the backplane controller is configured to perform:

receiving the control commands and the control data from the user for monitoring and controlling at least one drive of the first group of drives and the second group of drives on the backplane;

determining the address and the device number of the drive to which the control commands and the control data received are directed;

forwarding the control commands and the control data received to the first SMBUS sideband handler if the address is the first address; or forwarding the control commands and the control data received to the second SMBUS sideband handler if the address is the second address;

controlling the blinking of the LEDs of the first group of drives by the first SMBUS sideband handler if the address is the first address, or controlling the blinking of the LEDs of the second group of drives by the second SMBUS sideband handler if the address is the second address, respectively;

generating the responses by the first SMBUS sideband handler of the backplane controller if the address is the first address, or generating the responses by the second SMBUS sideband handler of the backplane controller if the address is the second address, respectively;

receiving the responses from the first SMBUS sideband handler if the address is the first address, or the second SMBUS sideband handler if the address is the second address, respectively; and sending the responses back to the host computer within the predetermined time period.

17. The computer-implemented method of claim 11, wherein the predetermined time period is less than 227 mS.

18. The computer-implemented method of claim 11, wherein the control commands and the control data are configured in accordance with the SES specification to instruct the backplane controller to monitor the drive and LEDs associated with the drive, and control the functions of the drive, and the LEDs associated with the drive.

19. A non-transitory computer storage medium having computer-executable instructions stored thereon which, when executed by a processor of a backplane controller, cause the processor to handle two SCSI Enclosure Services (SES) sidebands using one system management bus (SMBUS) controller by:

establishing communication between the backplane controller on a backplane and a host computer through a host bus adapter (HBA) over an SMBUS communication link, receiving control commands and control data from a user at the host computer for monitoring and controlling at least one drive of a first group of drives and a second group of drives on the backplane, wherein each of the at least one drive has an address and a device number;

determining the address and the device number of the drive to which the control commands and the control data received are directed;

forwarding the control commands and the control data received to a first SMBUS sideband handler of the backplane controller if the address is a first address; or forwarding the control commands and the control data received to a second SMBUS sideband handler of the backplane controller if the address is a second address, respectively;

controlling blinking of LEDs of the first group of drives by the first SMBUS sideband handler if the address is the first address, or controlling blinking of LEDs of the second group of drives by the second SMBUS sideband handler if the address is the second address, respectively;

generating responses by the first SMBUS sideband handler of the backplane controller if the address is the first address, or generating responses by the second SMBUS sideband handler of the backplane controller if the address is the second address, respectively;

receiving the responses from the first SMBUS sideband handler if the address is the first address, or the second SMBUS sideband handler if the address is the second address, respectively; and sending the responses back to the host computer within a predetermined time period.

20. The non-transitory computer storage medium of claim 19, wherein the backplane controller comprises an SMBUS controller in communication with an SMBUS interface of the HBA for receiving the control commands and the control data;

the first SMBUS sideband handler configured to control the blinking of the LEDs of the first group of drives installed on the backplane;

the second SMBUS sideband handler configured to control the blinking of the LEDs of the second group of drives installed on the backplane; and firmware of the backplane controller.

21. The non-transitory computer storage medium of claim 19, wherein the backplane controller is in communication with the host computer through the HBA having a PCI interface configured for the user to receive the control commands and the control data for monitoring and controlling at least one drive of the first group of drives and the second group of drives on the backplane;

a host bus adapter controller having firmware configured to perform HBA operations; and an SMBUS interface configured to communicate with the SMBUS controller of the backplane controller.

* * * * *